Dec. 12, 1944.  H. E. SOMES  2,364,924
HEAT TREATING APPARATUS
Filed Feb. 28, 1942  7 Sheets-Sheet 4
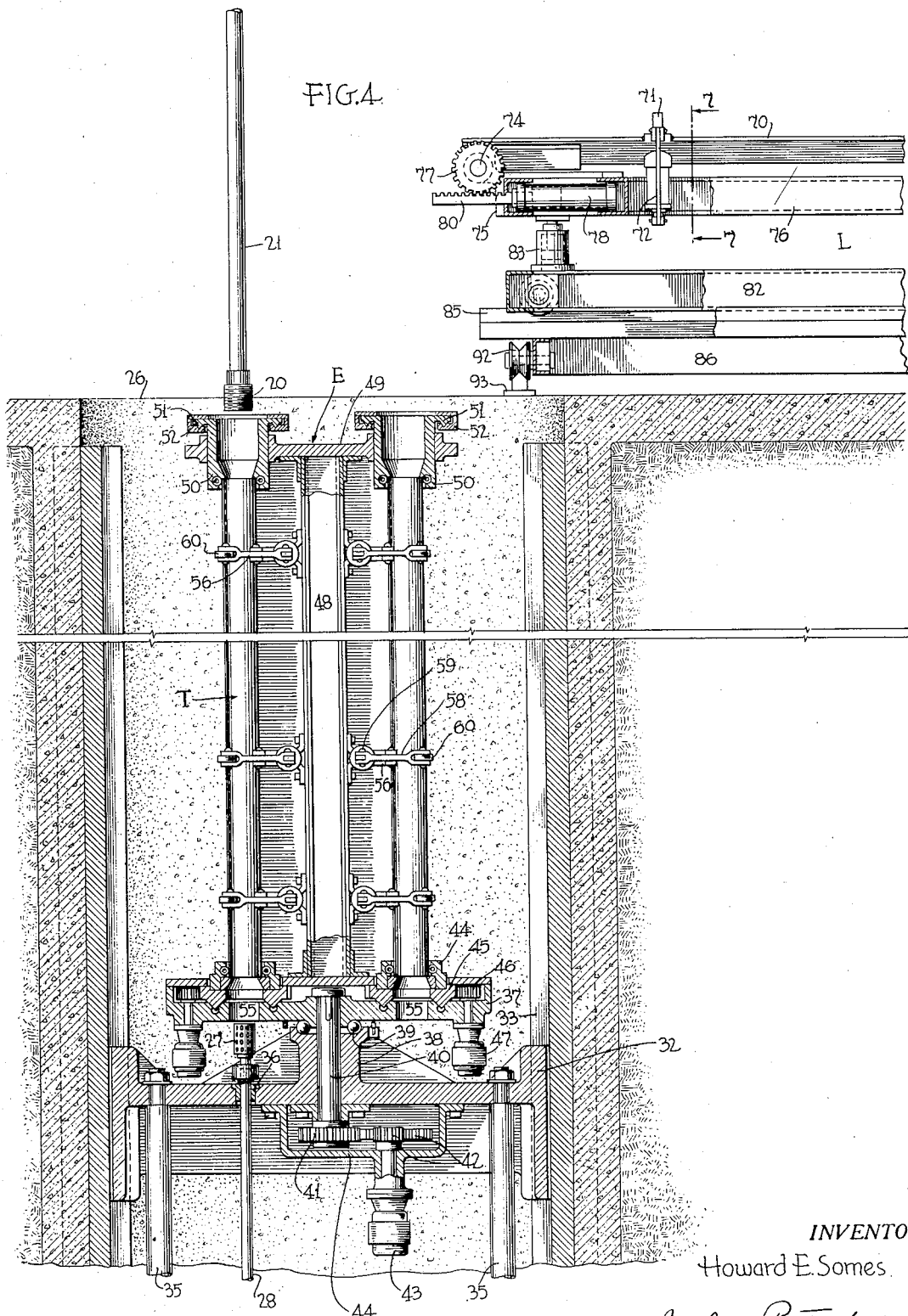
INVENTOR
Howard E. Somes.
BY John P. Tartox
ATTORNEY Dec. 12, 1944.　　　H. E. SOMES　　　2,364,924
HEAT TREATING APPARATUS
Filed Feb. 28, 1942　　　7 Sheets-Sheet 5
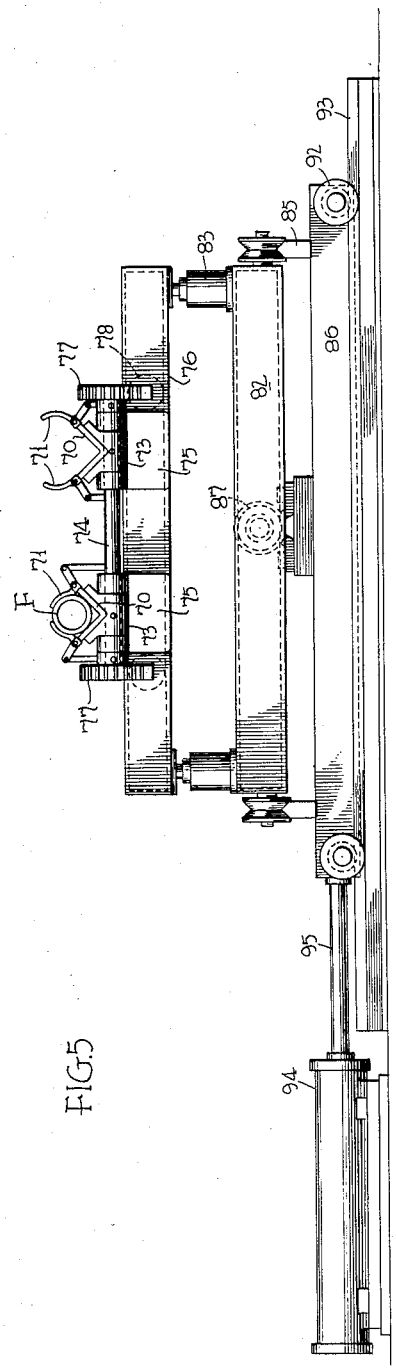
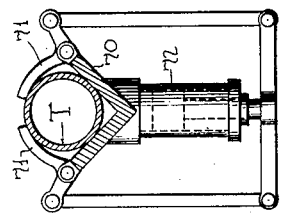
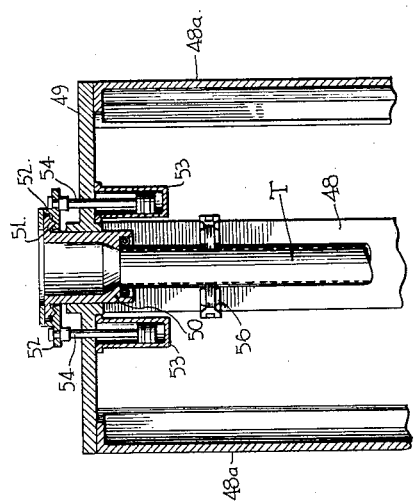
INVENTOR
Howard E. Somes.
BY John P. Tarbox
ATTORNEY

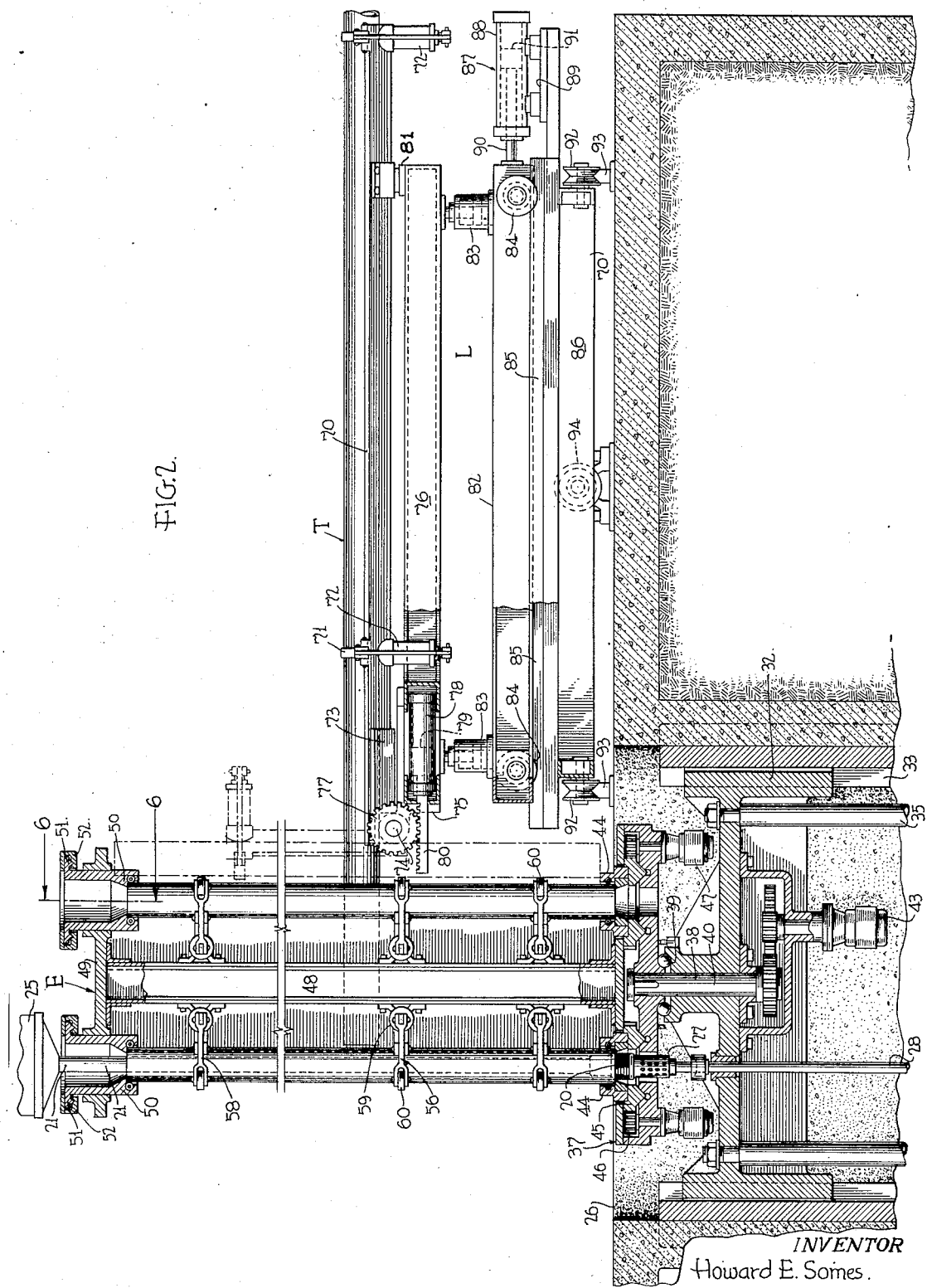

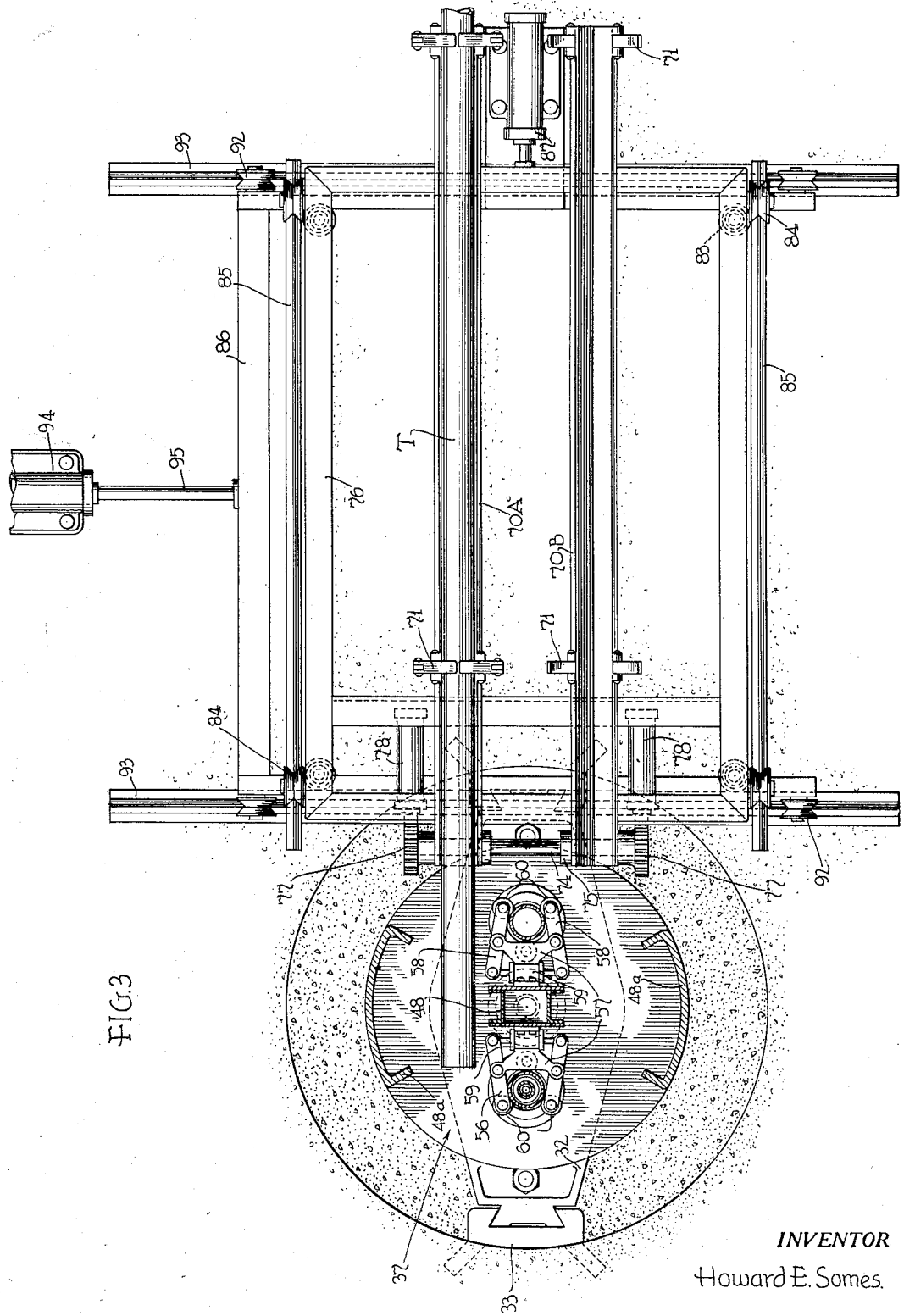

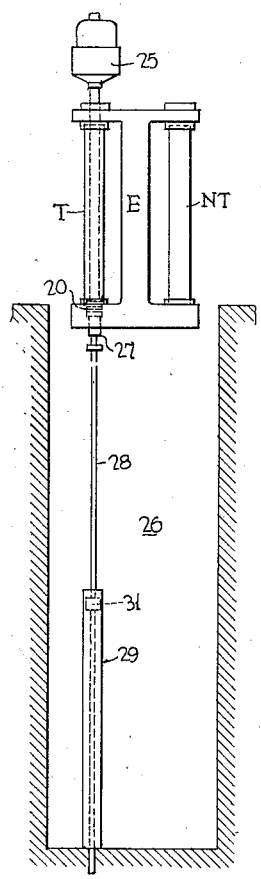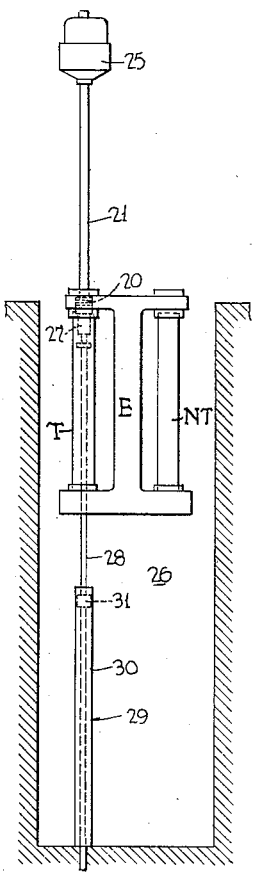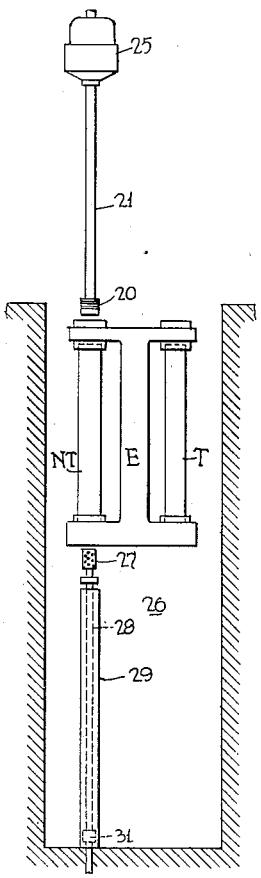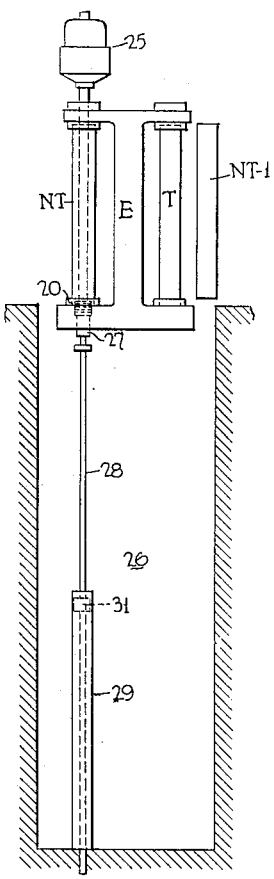
FIG.16  FIG.17  FIG.18  FIG.19
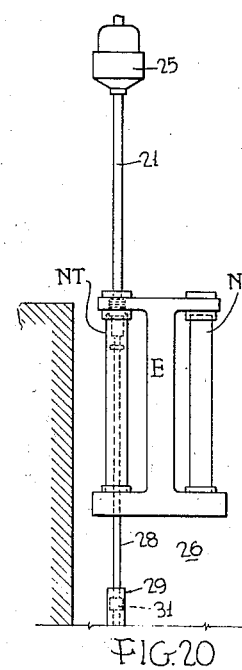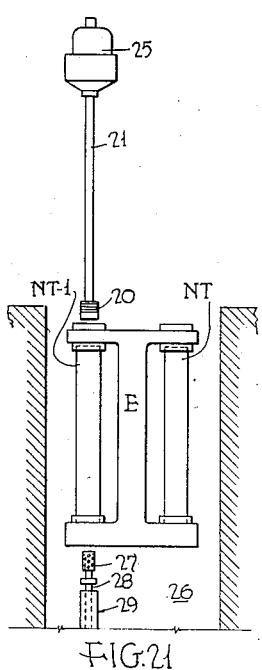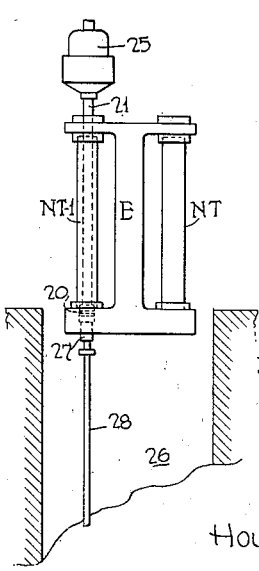
FIG.20  FIG.21  FIG.22
INVENTOR
Howard E. Somes.
BY John P. Tarbox
ATTORNEY Patented Dec. 12, 1944

2,364,924

UNITED STATES PATENT OFFICE 2,364,924

HEAT-TREATING APPARATUS

Howard E. Somes, Detroit, Mich., assignor to Budd Induction Heating, Inc., Philadelphia, Pa., a corporation of Michigan Application February 28, 1942, Serial No. 432,739

12 Claims. (Cl. 219—13)

This invention relates to heat treating apparatus, more particularly to apparatus for handling tubular members undergoing internal heat treatment.

It is known that tubular members can be materially strengthened by providing the same with an internally hardened layer of metal. In my U. S. Letters Patent No. 2,208,607, dated July 23, 1940, I have disclosed an apparatus for heating tubular articles by electromagnetic induction wherein a heating head and a quenching head are inserted into the tubular articles from its opposite ends and brought into aligned engagement and then relative movement is effected between these two heads and the tubular article to progressively heat and quench the internal surface thereof.

The present invention is an improvement on such apparatus and is directed to the internal heat treatment of relatively long tubes, such as tubes upwards of forty or fifty feet in length and of various diameters, such as, for example, tubes used for oil casing. Such tubes, because of their great weight, are extremely difficult to handle.

One of the objects of the present invention is to provide an efficient and advantageous means for progressively feeding tubes of this character relative to heating and quenching heads for heat treating the internal surfaces thereof, which such means is so designed as to facilitate handling of the tubes and to minimize delays between heat treatments of successive tubes.

Another object is to provide such an apparatus with an improved feeding means and improved mechanism for mechanically loading and unloading the same, which such means and mechanism are so correlated in their movements as to facilitate the handling of the tubes to be heat treated.

With the above and other objects in view which from the following detailed description will be apparent to those skilled in the art to which the present invention appertains, the present invention consists in certain features of construction and combinations of parts to be hereinafter described with reference to the accompanying drawings, and then claimed.

In the drawings which illustrate a suitable embodiment of the invention,

Figure 1 is a view schematically showing the general arrangement of parts of the present invention;

Figure 2 is a vertical section through portions of the apparatus showing the elevating mechanism in its uppermost position and the loading mechanism in a horizontal position for loading and unloading, it being understood that when the elevating mechanism is in the process of being vertically raised and lowered, the tube-carrying portion of the loading mechanism is in an upright position, as indicated by the broken outline, and withdrawn to the right to clear the elevating mechanism;

Figure 3 is a horizontal section through the elevating mechanism of Figure 2, taken as looking downwardly upon the loading mechanism;

Figure 4 is a view corresponding to Figure 2 but showing the elevating mechanism in its lowermost position;

Figure 5 is an end view of the loading mechanism;

Figure 6 is a vertical section taken approximately on line 6—6 of Figure 2;

Figure 7 is a transverse section taken approximately on line 7—7 of Figure 4;

Figure 1:
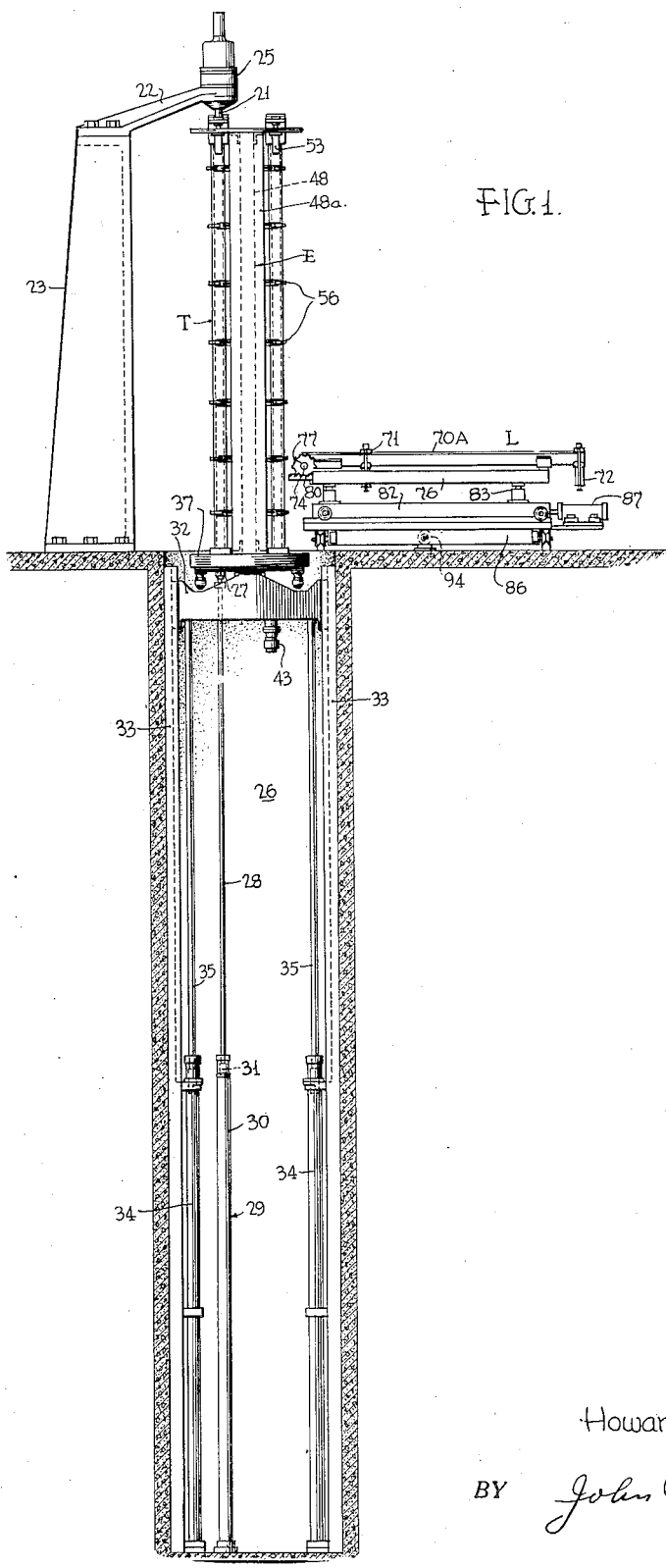

Figures 8 to 15, inclusive, are diagrammatic views showing various steps in the operation of the loading mechanism, and Figures 16 to 22, inclusive, are diagrammatic views showing various steps in the operation of the elevating mechanism.

Referring to the accompanying drawings in which like numerals refer to like parts throughout the several views, the apparatus of the present invention is particularly applicable to the heat treating of relatively long lengths of steel tubing, that is, tubing up to fifty feet in length and of great weight, to harden the interior surface thereof whereby to increase the strength of the same. The apparatus includes mechanism for heating and quenching the tubing, mechanism for progressively moving the tubing relative to the heating and quenching operation and mechanism for loading the tube-moving mechanism, all so correlated as to facilitate handling and heat treating the tubing in a vertical position.

In carrying out the heat treating operation, an electromagnetic induction heating apparatus is employed, such apparatus including an inducing head 20 supported on a rigid arbor 21 of a length corresponding to that of the tubes to be heat treated suspended from a bracket 22 projecting laterally from a suitable upwardly extending base 23. The bracket 22 supports a transformer mechanism 25 which supplies high-power high-frequency electrical current to the inducing coil of the head 20.

Since the particular design of the inducing head, its supporting arbor and the transformer mechanism does not form a part of the present invention, these parts have not been described in detail. However, for a full understanding of a suitable inducing head and transformer mechanism reference may be had to my U. S. Letters Patent Number 2,223,902, dated December 3, 1940, and Reissue Number 22,064, reissued April 7, 1942, respectively. In the present instance, however, the inducing head 20 and arbor 21 are stationary and do not move longitudinally during the heat treating operation as in said Reissue Patent Number 22,064.

Due to the extreme height of apparatus essential in order to heat treat tubes of great length, a portion of the apparatus is arranged within a pit 26 underlying the suspended inducing head 20, this pit, of necessity, as will be later apparent, being of a depth at least twice that of the length of the tubing to be heat treated.

The quenching apparatus comprises a quench discharging head 27 mounted upon the upper end of a supply tube 28 which is actuated from a lowermost position to an uppermost position into registering engagement with the bottom end of the inducing head 20 by means of hydraulic mechanism 29 comprising a fluid-pressure cylinder 30 and a piston 31 attached to the supply tube 28. It will be seen from the drawings, particularly Figure 4, that the inducing head 20 and quench head 27 are in axial alignment and that in the lowermost position of the quench head the two heads are separated a distance sufficient to clear the ends of the tube T. In Figure 2, the quench head 27 is shown in its uppermost position of engagement with the end of the inducing head 20.

In practicing the invention, a tube to be heat treated is arranged vertically in axial alignment with the separated heads 20 and 27, and is then raised to the position shown in Fig. 4 with the heating head extending through the tube to position the head 20 below the lower end of the tube. After this the quench head 27 is moved upwardly into registering engagement with the inducing head 20. Then, the tube is moved downwardly at a desired rate of travel during which time electrical energy is supplied to the inducing head from the transformer and quenching fluid is supplied to the quench head 27. The tube is thus heated to a hardening temperature and quenched during its downward travel. Also, in order to effect uniform treatment of the inner surface, the tube is rotated during its downward travel.

The elevating mechanism and means for supporting the tubes during the heat treating operation comprises a main platform 32 arranged for vertical movement within the pit 26 between vertical guideways 33 secured to the opposite side walls of the pit, as shown in Figures 3 and 4. The platform 32 is raised and lowered within the pit 26 by any suitable means such as the spaced vertical hydraulic cylinders 34 having reciprocable piston rods 35 secured at their upper ends to the platform 32, as shown in Figures 2 and 4.

Referring to Figure 4, the quench tube 28 extends through the platform 32 and is guided thereby through the medium of a suitable bushing 36. A horizontal rotary table 37 is mounted for rotation on an upwardly extending central hub 38 of the platform 32 through the medium of end thrust ball bearings 39. Rotation of the table 37 is effected by means of a vertical shaft 40 keyed to the table 37 and extending downwardly through the platform hub 38 and provided with a drive gear 41 which is driven by a gear train 42 from a suitable electric motor 43. The motor 43 is secured to a bracket 44 which is mounted on the under side of the platform 32. The table 37 is arranged to support two tubes at a time and, in order to support the tubes in a vertical position, upper and lower tube supports are provided. The lower tube supports comprise diametrically opposed annular chucking devices 44 adapted to closely engage the ends of the tubes in surrounding relation, each of these chucking devices being carried by an annular turntable 45 rotatably supported upon the table 37. Each turntable is provided with a toothed periphery which is meshed with a drive pinion 46 driven by a suitable electric motor 47.

The rotary table 37 is provided with an axially extending rigid standard 48 and side standards 48a radially spaced from the standard 48, a cross piece 49 being rigidly secured to the upper ends of the standards 48 and 48a. This cross piece carries the diametrically opposed upper tube supports, each of which comprises an annular chucking device 50 axially aligned with the corresponding lower chucking device 44. Each chucking device 50 is axially slidably mounted in the cross piece 49 and is rotatably suspended through an end thrust bearing 51 from an annular member 52. In order to axially slide each chucking device 50, fluid-pressure motors comprising hydraulic cylinders 53 and pistons 54 are provided, as shown in Figure 6, the rods of the pistons 54 being rigidly connected to the member 52. It is thus seen that for each lower chucking device 44 an axially opposed chucking device 50 is provided, the upper chucking device 50 being axially reciprocable so that by reciprocating the same axially away from the lower chucking device 44 a tube T can be vertically disposed with its lower end closely confined within the same, after which the upper chucking device 50 is reciprocated toward the lower device to closely engage the upper end of the tube T. It is to be noted also that each pair of upper and lower chucking devices are rotatably supported whereby the tube T may be rotated.

It is thus seen that the elevating and supporting mechanism just described is arranged, as shown in Figure 4, to support two tubes in diametrically opposed parallel relation and that the axis of the rotary table 37 is offset with respect to the common axis of the inducing and quench heads 20 and 27 so that one of the tubes T so supported is axially aligned with the heads 20 and 27. Axial openings 55 are provided in the table 37 in axial alignment with the supported tubes and these openings and the central openings of the chucks 44 and turntables 45 are of sufficient diameter to permit the quench head 27 to move therethrough into the particular tube T to be heat treated. The rotary table 37 and its rotating means thus provides an indexing fixture.

In view of the great length of the tubes which are to undergo heat treatment, it is extremely desirable to provide means for preventing transverse deflection intermediate their ends in order to maintain them truly coaxial throughout their entire length with the inducing and quench heads and thereby insure against contact between the walls thereof with the peripheries of the inducing and quench heads during relative movement between such heads and the tubes. In order to maintain rigidity of the tubes intermediate their ends, a series of roller clamps 56 are secured to each side of the vertical standard 48. Referring to Figures 3 and 4, each of these clamps may comprise a base 57 secured to the standard 48 and a pair of spaced clamp arms 58 pivoted to the base 57 intermediate their ends and adapted to be actuated toward and away from each other by means of a fluid-pressure motor 59. The ends of the arms 58 and the base 57 are provided with rollers 60 which when the clamp is closed, as in Figure 3, engage the tube at three spaced points, the rollers of the arms 58 tending to urge the tube toward the single roller of the base 57. The axes of the rollers 60 of course are parallel to the axis of the supported tube and such rollers of the series of clamps, while maintaining the tube against transverse deflection, permit the tube to freely rotate.

Figures 16 to 22, inclusive, are diagrammatic views which illustrate the sequence of operations of the tube elevating mechanism during the heat treating operation within a complete cycle. Figure 16 illustrates a condition in which the work elevating mechanism E has moved to its uppermost position with the heating head 20 positioned below the lower end of the tube. At this position the tube T at the left is about to be heated and quenched. A new tube NT has been inserted at the right in the elevating mechanism E. The quench head, 27, is in its elevated position.

Figure 17 illustrates the next point in the cycle of operation wherein the elevating mechanism E is moving toward its lowermost position, which is shown in Figure 18. During this movement the inner surface of the tube is subjected to the heating and quenching operation producing a hardened inner surface. At the completion of this operation the tube reaches the position shown in Fig. 18 and quench head 27 is withdrawn to a point below the tube as shown. Thereupon the elevating mechanism E has been rotated to position the new tube NT at the left in position for heat treatment and the treated tube T in position for unloading when elevated. Figure 19 illustrates the elevating mechanism as being in its uppermost position, the tube T being in position to be removed and replaced by a third untreated tube NT—1. In this position the heating and quenching heads are ready to begin a heat treating operation when lowering the tube NT. Figure 20 is a view corresponding to Figure 17 showing the elevating mechanism as approaching its lowermost position at the end of the treating operation. In Fig. 21 which corresponds with Figure 18, the quench head has been lowered to permit rotation of the work holder to locate the treated tube NT at the side for subsequent unloading and to position the third tube NT—1 in coaxial alignment with the inducing and quench heads 20 and 27. Figure 22 corresponds with Figure 19, the third tube NT—1 being ready for treatment and the second tube NT being in a position to be removed.

The elevating mechanism just described provides a simple and efficient expedient for handling tubes of great length and weight and, since it is arranged to carry two tubes simultaneously during its elevating and lowering movements, the time required between successive heat treating operations is very materially reduced since the mechanism is unloaded and loaded after each upward movement of the elevating mechanism and before the downward stroke of the same.

Referring to Figures 2, 3, 4 and 5, there is shown an improved mechanism for loading and unloading the elevating mechanism E each time it reaches its uppermost position. Steel pipes forty or fifty feet in length and of diameters ranging up to, for example, eleven inches or more are of such weight that it is impossible to manually upright them for loading in the elevating mechanism E. Accordingly, the loading mechanism of the present invention is so arranged as to provide for the most efficient mechanical handling of the tubes.

This mechanism is arranged with parallel V-shaped tube troughs 70A and 70B provided with pivoted clamp arms 71 which are actuated into and out of clamping position with a tube T contained within the trough 70, as shown in Figure 7, by means of a hydraulic motor 72 carried by the trough 70. These clamps are of such strength and construction as to be able to securely hold the clamped tube in a vertical position. The ends of the troughs 70 adjacent the heat treating apparatus are provided with rigid brackets 73, each of which is rigidly secured to a shaft 74. The shaft 74 is journalled in bracket supports 75 rigidly secured to a supporting frame 76 and is provided at its ends with toothed gears 77. The frame 76 carries fixed hydraulic cylinders 78 having fluid-actuated pistons 79 therein, the piston rods 80 of which are in the form of racks in mesh with the gears 77 so that upon reciprocation of the pistons 79 within the cylinders 78 the racks 80 rotate to cause the shaft 74 which is rigidly secured to the trough brackets 73 to move the troughs 70A and 70B from the horizontal position shown in solid outline in Figure 2 to the vertical loading and unloading position shown in broken outline. In the horizontal position, the troughs are supported at their free ends on the frame 76 as indicated at 81 in Figure 2.

The frame 76 is supported on a second frame 82 for vertical movement, so that the tubes can be raised or lowered relative to the lower chucks 44, through the medium of hydraulic motors 83 suitably located on the second frame 82.

Provision is also made to move the tubes supported in the troughs 70A and 70B in a horizontal direction toward and away from the axis of the upper and lower tube chucks. The second frame 82 accordingly is provided with a plurality of guide rollers 84 which are rotatably guided on spaced tracks 85 carried by a third frame 86. The horizontal movement of the frame 82 is effected through a hydraulic motor 87, the cylinder 88 of which is carried by a support 89 secured to the third frame 86. The piston rod 90 of the motor 87 is rigidly secured to the second frame 82 so that upon actuation of the piston 91 within the cylinder 87 the frame 82 can be horizontally moved on the tracks 85 toward and away from the elevating mechanism E.

Since in the operation of the apparatus, a heat treated tube is removed from the elevating mechanism E and a tube to be heat treated is placed in the elevating mechanism before the elevating mechanism is lowered into the pit 26, a means is provided for horizontally shifting the troughs 70A and 70B relative to the elevating mechanism to move each trough into unloading and loading positions.

In order to accomplish this, the third frame 86 is provided with guide rollers 92 which are rotatably guided on spaced tracks 93 extending at right angles to the tracks 85. A suitable hydraulic motor 94 is secured to the foundation of the apparatus and has its reciprocable piston rod 95 secured to the third frame 86 so that upon reciprocation of the piston rod 95 the frame 86 is moved along the tracks 93.

Figure 8:
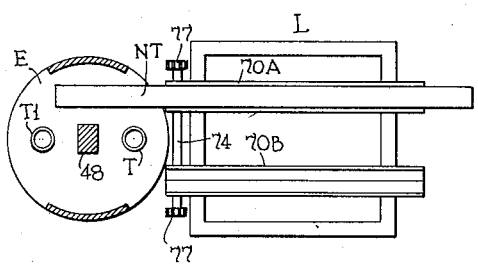

In Figures 8 to 15, inclusive, I have diagrammatically illustrated the sequence of loading and unloading operations, the loading mechanism being designated "L." Figure 8 illustrates the step in the sequence wherein the tube troughs are in a horizontal position, the trough 70A being loaded with an untreated tube NT and the trough 70B being empty.

Figure 12:
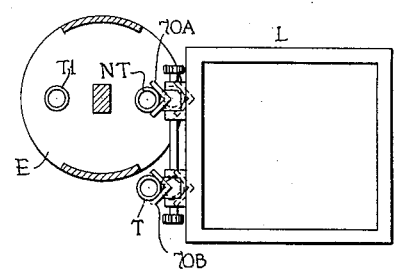
Figure 9:
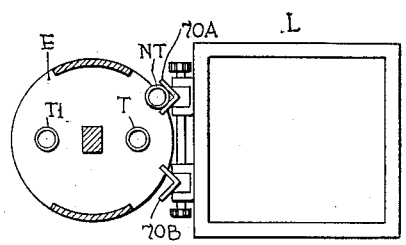
Figure 10:
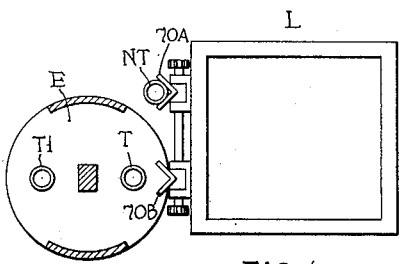
Figure 14:
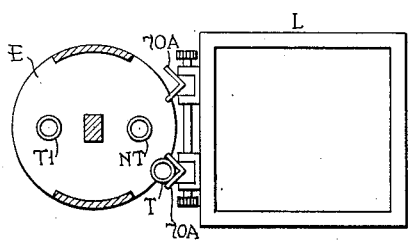
Figure 11:
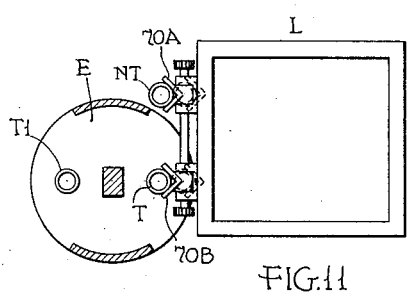

By actuating the hydraulic motors 78, the troughs 70A and 70B are tilted to the upright position shown in Figure 9. Then, the motor 94 is actuated to shift the tube troughs to position the trough 70B adjacent the tube T which has been heat treated and ready to be removed from the elevating mechanism E, as indicated in Figure 10. Next, the motor 87 is actuated to move the loading mechanism L toward the elevating mechanism E to engage the tube T with the trough 70B, whereupon the clamps 71 are actuated by the motors 72 to clamp tube T and the clamps 56 of the elevating mechanism E are released through the operation of motors 59. This position is shown in Figure 11. After the upper chuck 50 has been raised (Figure 2) the troughs are raised a sufficient amount by actuation of the motors 83 so that the tube T will clear the lower chuck 44. Then, the loading mechanism L is shifted by motor 94 to position tube NT in trough 70A for loading in the chucks 44 and 50. This position is shown in Figure 12.

Now, with reference to Figures 2 and 6, the hydraulic motors 83 are actuated to lower the tube NT so that its lower end is positioned within the lower chuck 44. After this, the motors 53 (Figure 6) are actuated to lower the upper chuck around the upper end of the untreated tube NT, and then the motors 59 (Figure 3) are actuated clamping the tube between the rollers 60, after which the motors 72 for the trough clamps 71 are actuated to release clamps 71 from clamping engagement with the tube NT.

Figure 13:
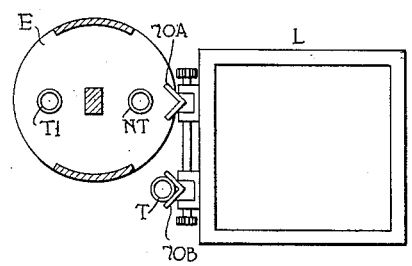
Figure 15:
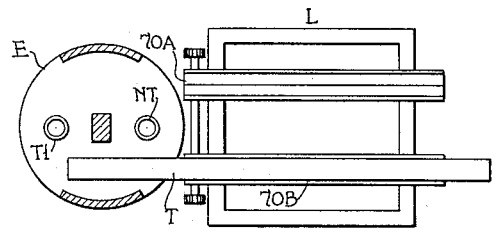

The motor 87 then upon actuation withdraws the frame 82 to the position shown in Figure 13. Subsequently, motor 94 actuates the frame 86 to the position shown in Figure 14, whereupon the motors 78 lower the troughs 70 onto the frame 76 as indicated in Figure 15. The tube T is then removed from the trough 70B, upon release of clamps 71, by any suitable means such as a suitable crane and a new untreated tube (not shown) is placed in trough 70A and clamped in position. The troughs 70 are then moved to the upright position, the trough 70B being empty.

The elevating mechanism E is then lowered as previously described, to heat treat the tube which is in alignment with the heating and quenching heads, then rotated to align the untreated tube for heat treatment and the treated tube for unloading and then elevated. In order to permit unrestrained expansion of the portions of the tube underlying the clamps 56 and undergoing immediate heat treating, the clamps 56 are arranged to be progressively opened and closed as they are moved past the heating head 20. In other words, each clamp 56 is opened during the period the portion of the tube underlying the same is being heated. Upon raising the work support, the loading mechanism L is moved to a position corresponding to that of Figure 11 to align the trough 70B into clamping position with the previously heat treated tube T—1 for removal from the elevating mechanism, the same as in the case of the tube T.

From the foregoing it is seen that I have provided mechanism for advantageously handling tubes of great length for internal heat treatment. The loading and elevating mechanisms are so designed and correlated in their respective movements as to eliminate all unnecessary movements and to minimize time in loading and unloading between successive heat treating operations.

Some portions of the apparatus have been more or less diagrammatically illustrated for the sake of clarity of showing, a detailed showing of such parts not being necessary for a clear understanding of the invention. I have not shown the control circuits for the electrical and hydraulic apparatus or the timing mechanism for effecting the operation of such apparatus in predetermined sequence. However, such controls may be of any suitable character well known to those skilled in the art.

The mechanism for unloading and loading the elevating mechanism is described and claimed in my copending divisional application, Serial No. 535,535, filed May 13, 1944.

It is to be understood that various changes in the detailed construction of the various parts and in the arrangement of such parts will be apparent to those skilled in the art without departing from the spirit of the present invention, the scope of which is defined by the appended claims.

What is claimed is:

1. In an apparatus for heat treating the internal surfaces of relatively long tubular workpieces and having a heating head of a size less than the internal diameter of the workpiece to be heat treated, means for moving the workpiece longitudinally relative to the heating head with the heating head coaxially therewithin to progressively heat the internal surface thereof, comprising a reciprocable work support, axially spaced and aligned means on said support for securely holding the ends of the workpiece to be heat treated, means on said support intermediate said aligned means for engaging the workpiece intermediate the ends thereof to restrain the workpiece against transverse deflection and to maintain the same straight, and motor means for reciprocating said support relative to said heating head.

2. In an apparatus for heat treating the internal surfaces of relatively long tubular workpieces and having a heating head of a size less than the internal diameter of the workpiece to be heat treated, means for moving the workpiece longitudinally relative to the heating head with the heating head coaxially therewithin to progressively heat the internal surface thereof, comprising a reciprocable work support, axially spaced and aligned means on said support for securely holding the ends of the workpiece to be heat treated, means for effecting relative axial movement of said aligned means toward and away from each other to permit the workpiece to be positioned between said aligned means in axial alignment therewith, means on said support intermediate said aligned means for engaging the work-piece intermediate the ends thereof to restrain the workpiece against transverse deflection and to maintain the same straight, and motor means for reciprocating said support relative to said heating head.

3. In an apparatus for heat treating the internal surfaces of relatively long tubular workpieces and having a heating head of a size less than the internal diameter of the workpiece to be heat treated, means for moving the workpiece longitudinally relative to the heating head with the heating head coaxially therewithin to progressively heat the internal surface thereof, comprising a reciprocable work support having axially spaced elements, a chuck member rotatably supported in each of said elements and in coaxial alignment with each other for surrounding the ends of the tubular workpiece to be heat treated in supporting relation, motor means for rotating at least one of said chuck members, means on said support engaging the workpiece intermediate its ends to prevent transverse deflection thereof, said last-named means being arranged to permit free rotation of the workpiece, and motor means for longitudinally reciprocating said workpiece relative to said heating head.

4. In an apparatus for heat treating the internal surfaces of relatively long tubular workpieces and having a heating head of a size less than the internal diameter of the workpiece to be heat treated, means for moving the workpiece longitudinally relative to the heating head with the heating head coaxially therewithin to progressively heat the internal surface thereof, comprising a reciprocable work support having spaced elements, a chuck member rotatably supported in each of said elements and in coaxial alignment with each other for surrounding the ends of the tubular workpiece to be heat treated in supporting relation, motor means for rotating at least one of said chuck members, means on said support engaging the workpiece intermediate its ends to prevent transverse deflection thereof, said last-named means being arranged to permit free rotation of the workpiece, and motor means for longitudinally reciprocating said workpiece relative to said heating head, said intermediate means including clamp members having rollers thereon for engaging the workpiece at a plurality of points about its circumference.

5. In an apparatus for heat treating the internal surfaces of tubular workpieces from the inside and having a heating head of a size less than the internal diameter of the workpiece to be heat treated, a reciprocable workpiece support, guide means for said support to permit reciprocation thereof parallel to the axis of said heating head, a rotary member rotatably mounted on said support and having its axis of rotation parallel to and laterally offset relative to the axis of said head, a plurality of pairs of coaxial chucking devices on said rotary member, the chucking devices of each pair being axially spaced to engage and support the opposite ends of a workpiece to be heat treated, the axes of said pairs of chucking devices being parallel to each other and to the axis of said rotary member and uniformly radially spaced therefrom a distance equal to the distance between the axes of said head and rotary member, motor means for rotating said member to coaxially align a pair of chucking devices with said head, and motor means for reciprocating said support.

6. In an apparatus for heat treating the internal surfaces of tubular workpieces from the inside and having a heating head of a size less than the internal diameter of the workpiece to be heat treated, a reciprocable workpiece support, guide means for said support to permit reciprocation thereof parallel to the axis of said heating head, a rotary member rotatably mounted on said support and having its axis of rotation parallel to and laterally offset relative to the axis of said head, a plurality of pairs of coaxial chucking devices on said rotary member, the chucking devices of each pair being axially spaced to engage and support the opposite ends of a workpiece to be heat treated, the axes of said pairs of chucking devices being parallel to each other and to the axis of said rotary member and uniformly radially spaced therefrom a distance equal to the distance between the axes of said head and rotary member, motor means for rotating said member to coaxially align a pair of chucking devices with said head, and motor means for reciprocating said support, the chucking members of each pair being rotatably mounted in said rotary member and including motor means for rotating the same during reciprocation of said support.

7. In an apparatus for heat treating the internal surfaces of tubular workpieces from the inside, a platform having a rotary table thereon, a plurality of pairs of coaxial, axially spaced work supports on said rotary table having their axes parallel to the axis of said table and uniformly spaced therefrom, each pair of supports being arranged to engage and support the ends of a tubular workpiece to be heat treated, a heating head of less size than the diameter of the tubular workpiece to be heat treated, said head having its longitudinal axis parallel to the axis of said table and spaced therefrom a distance equal to the spacing of the axes of said pairs of supports from the axis of said table, motor means on said support for rotatively indexing said table to axially align one pair of supports and the workpiece carried thereby with said head, and means for effecting relative longitudinal movement between said head and platform, whereby to effect progressive heating of the internal surface of the workpiece.

8. In an apparatus for heat treating the internal surfaces of tubular workpieces from the inside, a platform having a rotary table thereon, a plurality of pairs of coaxial, axially spaced work supports on said rotary table having their axes parallel to the axis of said table and uniformly spaced therefrom, each pair of supports being arranged to engage and support the ends of a tubular workpiece to be heat treated, a heating head of less size than the diameter of the tubular workpiece to be heat treated, said head having its longitudinal axis parallel to the axis of said table and spaced therefrom a distance equal to the spacing of the axes of said pairs of supports from the axis of said table, motor means on said support for rotatively indexing said table to axially align one pair of supports and the workpiece carried thereby with said head, and means for effecting relative longitudinal movement between said head and platform whereby to effect progressive heating of the internal surface of the workpiece, said supports being rotatably mounted on said table, and means for rotating at least one of said supports to effect rotation of the workpiece supported thereby during relative movement of the workpiece and heating head.

9. In an apparatus for heat treating the internal surfaces of tubular workpieces from the inside, an induction heating head, a platform movable axially relative to said head, movable indexing means carried by said platform, a plurality of tube supporting means carried by said indexing means each adapted to hold a tubular workpiece to be heat treated with the axis thereof parallel to the axis of said head, motor means for moving said indexing means to axially align one of the workpieces supported thereby through said supporting means with said head, and motor means for progressively moving said platform and the aligned workpiece axially relative to said head with the aligned workpiece in surrounding relation with respect to said head whereby to progressively heat the inner surface of such workpiece and for withdrawing the heat treated workpiece from its head-surrounding position, said indexing means then being movable by said first motor means to axially align another workpiece supported thereby with said head.

10. In an apparatus for heat treating the internal surfaces of tubular workpieces from the inside, an induction heating head, a platform movable axially toward and away from said head, movable indexing means on said platform, a plurality of tube supporting means carried by said indexing means, each adapted to hold a tubular workpiece to be heat treated with the axis thereof parallel to the axis of said head, motor means for moving said indexing means to axially align one of the workpieces supported thereby with said head, and motor means for progressively moving said platform and the aligned workpiece axially relative to said head with the aligned workpiece in surrounding relation with respect to said head whereby to progressively heat the inner surface of such workpiece and for withdrawing the heat treated workpiece from its head-surrounding position, said indexing means then being movable by said motor means to axially align another workpiece supported thereby with said head, each of said tube supporting means being rotatable on said indexing means, said apparatus including motor means for rotating the supporting means during progressive heating of the tube supported thereby.

11. An apparatus for heat treating the internal surfaces of relatively long tubular workpieces, including a heating head of a size less than the internal diameter of the workpiece to be heat treated, means for moving the workpiece longitudinally relative to the heating head with the heating head therein to progressively heat the internal surface thereof, comprising a reciprocable work support, work holding means including a plurality of external clamping devices spaced longitudinally of the workpiece and adapted to engage the outer surface thereof at longitudinally spaced points, and means for successively releasing said workpiece of the pressure of each of said clamping devices during movement of the successive points of engagement past said heating head.

12. In an apparatus for heat treating the internal surfaces of relatively long tubular workpieces and having a heating head of less diameter than the inside diameter of the workpiece to be heat treated, a work support, axially spaced and aligned annular means on said support for securely holding the ends of the workpiece to be heat treated, a plurality of spaced clamping elements on said support intermediate said annular means for releasably engaging the workpiece at spaced regions intermediate the ends thereof to restrain the workpiece against transverse deflection, means for effecting relative axial movement between said heating head and said work support to progressively heat the inside surface of the workpiece supported by said support, and means for successively releasing said clamping elements from engagement with the workpiece during heating of the inside surface of the workpiece at said regions and for successively re-engaging said clamping elements with the workpiece after heating of said regions.

HOWARD E. SOMES.